United States Patent [19]

Kortenbusch

[11] 4,211,518
[45] Jul. 8, 1980

[54] METHOD AND ARRANGEMENT FOR HYDRAULIC CONVEYING OF SOLIDS

[75] Inventor: Werner Kortenbusch, Lünen, Fed. Rep. of Germany

[73] Assignee: Ruhrkohle AG, Essen, Fed. Rep. of Germany

[21] Appl. No.: 906,846

[22] Filed: May 15, 1978

Related U.S. Application Data

[63] Continuation-in-part of Ser. No. 847,916, Oct. 27, 1977, abandoned, which is a continuation of Ser. No. 768,352, Feb. 14, 1977, abandoned, which is a continuation of Ser. No. 638,483, Dec. 8, 1975, abandoned.

[30] Foreign Application Priority Data

Dec. 7, 1974 [DE] Fed. Rep. of Germany ....... 2457942

[51] Int. Cl.² ............................................. F04F 11/00
[52] U.S. Cl. ...................................... 417/54; 417/103; 417/900
[58] Field of Search ........................................ 417/1–3, 417/26, 54, 92, 93, 97–103, 122–900, 238; 73/32 R, 448, 451, 453, 454

[56] References Cited

U.S. PATENT DOCUMENTS

| | | | |
|---|---|---|---|
| 2,949,027 | 8/1960 | Eolkin | 73/32 |
| 2,989,227 | 6/1961 | Statham | 417/238 |
| 3,556,682 | 1/1971 | Sakamoto et al. | 417/122 X |
| 3,938,912 | 2/1976 | Sakamoto et al. | 417/900 X |

Primary Examiner—Carlton R. Croyle
Assistant Examiner—Edward Look
Attorney, Agent, or Firm—Michael J. Striker

[57] ABSTRACT

An arrangement for hydraulically conveying solids of different specific weights in form of slurries has at least two elongated chambers the effective length of each of which may be varied in dependence on the specific weight of the solid component of the slurry supplied to the respective chambers. The slurry is cyclically fed into the chambers at substantially atmospheric pressure, and when the respective chamber is full pressurized hydraulic fluid, such as water, is utilized for discharging the slurry from the full chamber into a discharge conduit. The arrangement includes a device which measures the specific weight of the solid component and varies the length of the respective chamber in dependence on the measured specific weight. A plurality of valves controls the admission of the slurry and of the pressurized hydraulic fluid into the respective chambers so that, when one of the chambers is being filled with slurry, another chamber is discharged into the discharge conduit. The whole effective length of the respective chambers is used for conveying coal particles whereas the shortened effective length is used for conveying rock particles. A method is also disclosed.

8 Claims, 11 Drawing Figures

METHOD AND ARRANGEMENT FOR HYDRAULIC CONVEYING OF SOLIDS

CROSS-REFERENCE TO RELATED APPLICATIONS

This application is a continuation-in-part of copending application Ser. No. 847,916, filed Oct. 27, 1977 and now abandoned which is a continuation of application Ser. No. 768,352, filed on Feb. 14, 1977 and now abandoned, and which in turn is a continuation of application Ser. No. 638,483, filed Dec. 8, 1975 and now abandoned.

BACKGROUND OF THE INVENTION

1. Field of the Invention

The present invention relates to a method and arrangement for hydraulic conveying of solids in general, and more particularly to a hydraulic conveying device for solids of different specific weights, such as coal and rock, and to a hydraulic conveying method.

2. The Prior Art

Various hydraulic conveying arrangements of the type here under consideration are already known. Generally speaking these employ chambers into which a slurry is introduced at substantially atmospheric pressure, to be discharged therefrom at an elevated pressure by a pressurized hydraulic fluid, such as readily available water.

Such arrangements are used, for instance, for conveying an aqueous slurry of coal particles from an underground excavation to the surface. An important advantage of such an arrangement is that the slurry is fed into the respective chamber at substantially atmospheric pressure so that the coal particles accumulate in the chamber; this means that conventional slurry pumps which are incapable of generating any substantial pressure or velocity head can nevertheless be used for feeding the slurry into the chamber. On the other hand, once the chamber is filled with the slurry, and particularly with the coal particles, high-pressure hydraulic fluid, such as water, is admitted into the chamber, entrains the coal particles and discharges them in form of a slurry into a discharge conduit. Inasmuch as the pressurized water or similar fluid does not contain any solid particles to speak of, high-output pumps, such as centrifugal pumps, which are sensitive to solid impurities contained in the fluid being pumped, can be used for supplying the pressurized water to the chamber from which the coal particles are to be discharged. Since such high-output pumps generate substantial velocity, and particularly pressure head, the slurry discharged from the chamber into the discharge conduit has sufficient energy to overcome substantial elevational differences and/or to be conveyed over substantial distances. Such an arrangement includes a plurality of valves which are selectively operated to establish communication of the chamber with either the source of slurry, or the source of the pressurized fluid on the one hand, and with the discharge conduit on the other hand.

It will be appreciated that when only one such chamber is utilized, the operation of the arrangement can only be intermittent. This means that, when the chamber is being filled, no flow exists in the discharge conduit which, of course, is very disadvantageous, particularly since the particles entrained in the water will settle and thus possibly clog the discharge conduit.

Therefore, it has already been proposed to use at least two chambers which are alternatingly filled and discharged, whereby continuous flow is obtained in the discharge conduit. The chambers may be filled and discharged concurrently, that is, both the slurry and the pressurized hydraulic fluid may be admitted into each chamber at the same end thereof, and the slurry may be discharged from the respective chamber at the other end thereof. However, experience has shown that it is more advantageous to operate the chambers in countercurrent, that is, to admit and discharge the slurry at one end of the respective chamber, and admit the pressurized hydraulic fluid at the other end of each respective chamber.

However, when such an arrangement is to be used for conveying material from an underground excavation to the surface, it has been found that some difficulties arise in connection with the operation of the arrangement, particularly due to the fact that the material to be conveyed to the surface includes not only coal particles, but also rock particles from the strata surrounding the seam of coal. The material to be conveyed comprises, in addition to particles of different specific weights, also particles of different sizes and thus of different weights. When the particulate material is conveyed through the discharge conduit to the surface, by being entrained with the pressurized hydraulic fluid, the result of the different specific weights, sizes, and weights of the particles is that some of the particles will move through the discharge conduit at a slower speed than other particles. Thus, experience with this conventional type of arrangement has shown that under certain conditions the differences in speeds of the particles may result in accumulation of the particles in some regions of the discharge conduit, whereby the conduit may become clogged. Because of this danger the conventional arrangements for conveying solids of this type have not yet found widespread acceptance in the mining industry.

The efficiency of a hydraulic conveying system increases with the increasing length of the chambers, particularly since the quantity of pressurized hydraulic fluid which is needed to discharge the contents of the chamber into the discharge conduit remains, for all intents and purposes, virtually the same for all lengths of the chambers. This, of course, means that the concentration of the slurry increases with the increasing length of the respective chamber. Also, the filling time for a longer chamber is longer than for a shorter chamber so that the admitting and discharging valve need not be switched as often with a longer chamber as with a shorter chamber, which means that the valves need not be replaced or repaired as often. This improves the efficiency of such hydraulic limitations to the increase in length of the chamber, resulting, mainly from the limited capacity of the slurry pump. The elevation head of the slurry pump determines the permissible length of the chambers, due to the fact that the filling speed of the chambers must be held constant. Inasmuch as the filling speed of the chamber depends on the concentration of the slurry, the fact that the slurry may include particles of different specific weights, sizes and weights will have a profound influence upon the filling speed of the chamber and thus on the efficiency of the conveying arrangement.

SUMMARY OF THE INVENTION

Accordingly, it is a general object of the present invention to avoid the disadvantages of the prior art.

More particularly, it is an object of the present invention to provide an arrangement for hydraulically conveying solids in form of slurries, which is both simple in construction and reliable in operation.

A further object of the present invention is to provide a hydraulic conveying arrangement for conveying solids of different specific weights in which the possibility of clogging of conduits is kept to a minimum.

A concomitant object of the present invention is to provide a hydraulic conveying arrangement in which the filling speed of the chambers may remain constant, irrespective of the specific weight of the solid component of the slurry.

Still another object of the present invention is to provide a hydraulic conveying arrangement which is economical but offers a high degree of reliability.

An additional object is to provide an improved method for the hydraulic conveying of solids-containing slurries.

In pursuance of these objects and others which will become apparent hereinafter, one feature of the present invention resides, briefly stated, in the arrangement for hydraulically conveying solids of different specific weights in form of slurries, in a combination which comprises at least two elongated chambers; a source of slurry; a source of pressurized hydraulic fluid; conduit means including supply conduits communicating the sources with the chambers, and a discharge conduit, communicating with the chambers; valve means operative for selectively cyclically establishing and interrupting communication of the conduits with the chambers; and means for varying the effective length of each of the chambers in dependence on the specific weight of the solid component of the slurry supplied by the slurry source.

According to a currently preferred embodiment of the present invention, each chamber has a part which can be included into the path of flow of the slurry and of the hydraulic fluid through the chamber, or can be selectively excluded from such path, and closing elements, such as valves, are used for including or excluding such part from the path.

It is also proposed, according to a further feature of the present invention, to provide in the conduits of the arrangement a device for measuring the specific weight of the solid component, and to operate the arrangement (e.g. particularly to shorten and lengthen the respective chamber) in dependence on the measurements obtained by the specific-weight measuring device.

It has been found to be very advantageous to use the entire effective length of each respective chamber for conveying solid particles the specific weight of which corresponds, for instance, to that of coal, while the shortened effective length of each respective chamber is used for conveying particulate material having a specific weight exceeding that of e.g. coal.

When the hydraulic conveying arrangement is operated in the manner which has been explained above, the arrangement operates in a highly efficient and reliable manner. Thus, in normal operation the chambers are filled in their entirety with slurry containing coal particles, which means that only a minimum amount of pressurized hydraulic fluid will be needed for emptying the chambers.

On the other hand, when the slurry with which the chamber is to be filled contains an inordinate amount of particles of a specific weight exceeding that of coal, only the shortened effective length of the chamber is filled with the slurry, so that such a chamber is emptied more frequently, where the column of slurry in the discharge conduit leading to the surface is interrupted by relatively frequent intervals of clear hydraulic fluid, so that the possibility of clogging of the discharge conduit is substantially lessened. The presence of the clear hydraulic fluid intervals between the slurry intervals counteracts the adverse effects of the slippage between the rock particles and the pressurized hydraulic entraining fluid, which slippage may amount to as high as 40%, so that the danger of clogging of the discharge conduit by rock and coal particles is all but eliminated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
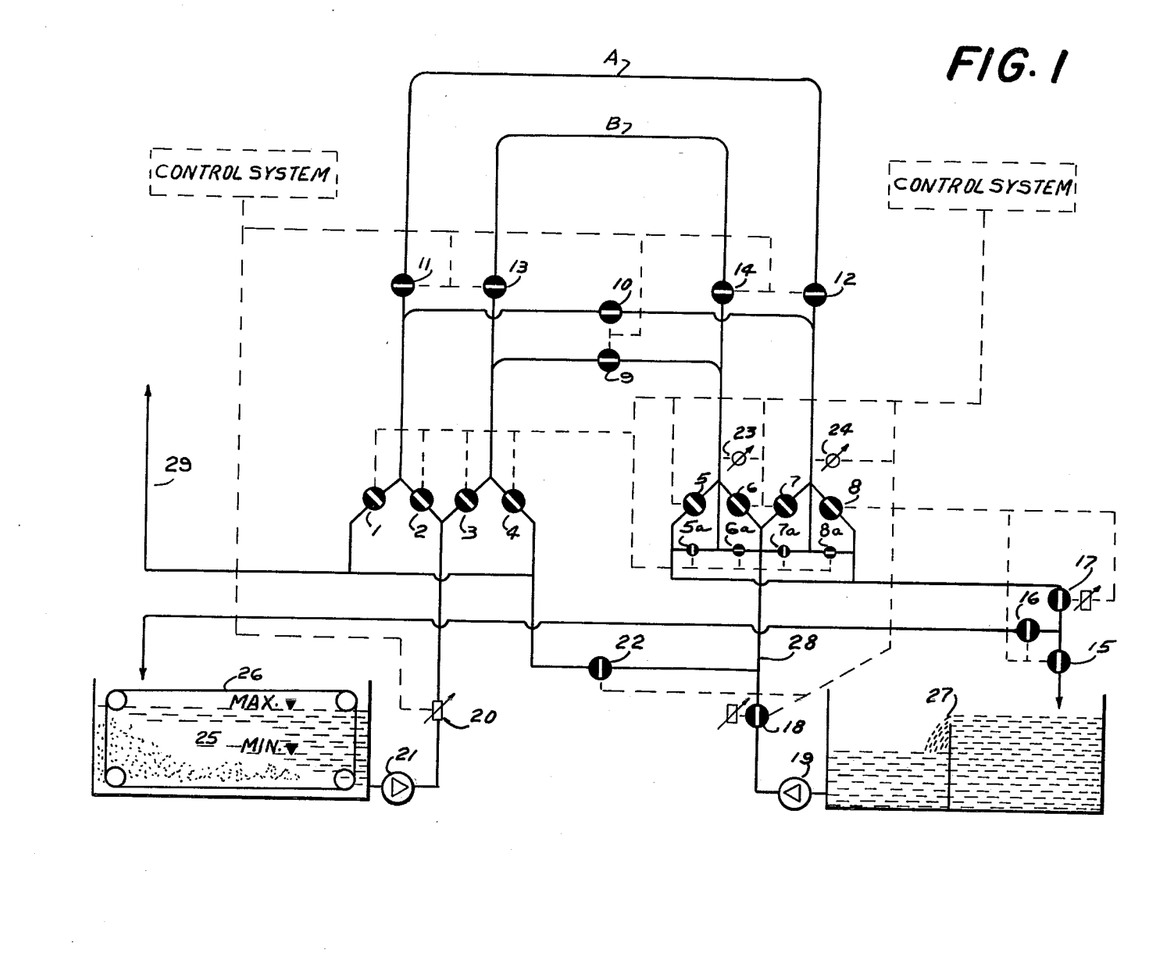
FIG. 1 is a diagrammatic illustration of a hydraulic conveying arrangement in accordance with the present invention.

Referring now to the drawing, and firstly to FIG. 1 thereof, it may be seen that the slurry which is to be conveyed and which includes solid particles of low specific weight as well as solid particles of high specific weight, is accommodated in a receptacle 25 in which there is arranged a conventional feeding conveyor 26. An outlet of the receptacle 25 communicates with a slurry pump 21 which pumps the slurry into chambers A and B via valves 2 and 3, respectively. The length of the chambers A and B is selected by valves 9 to 14. A clear hydraulic fluid, such as water, is available from a receptacle 27, and a hydraulic pump 19 pressurizes the medium and delivers it to the chambers A and B via valves 6 and 7. The pressurized slurry is discharged from the chambers A and B via valves 1 and 4 into a discharge conduit 29 which e.g. leads to the surface. Low-pressure water can be discharged from the chambers A and B through valves 5 and 8, either into a receptacle 27 via valves 17 and 15, or into a receptacle 25 via valves 17 and 16. Pressure equalization valves 5a to 8a are arranged in the hydraulic circuit in parallelism with the valves 5 to 8. Pressure measuring devices 23 and 24 (e.g. contact manometers) measure the pressure in the chambers A and B. A branch duct connects a supply conduit 28 which communicates the pump 19 with the valves 6 and 7, downstream of a valve 18 with the discharge conduit 29, and a valve 22 is interpose in this branch duct. A specific weight measuring device 20 is interposed in the conduit which communicates the slurry pump 21 with the valves 2 and 3.

Various details of the arrangement for conveying solids in form of a slurry according to the present invention will become apparent from the following discussion of the operation of the arrangement. By way of introduction, it is noted that when the specific weight of the slurry which is delivered by the slurry pump 21 exceeds or drops below a predetermined value which is indicative of the presence of solid particles of high or low specific weight, the specific weight measuring device 20 generates a signal which energizes an actuating device for the valves 9 to 14 in such a manner that, when the specific weight of the particular material in the slurry corresponds to that of coal, the slurry is fed into the long chambers A and B by opening the valves 11 to 14, whereas when the specific weight of the particular material in the slurry exceeds the specific weight of coal, which is indicative of rock particles, the valves 9 and 10 are opened so that the slurry is conducted through the shortened chambers.

It should be understood that the density measuring device 20 may be one of the various types which are known per se in the art. Such devices are commercially available from e.g. the firm of L. Krohne in Duisburg, Germany, under the designation "DENSICONT Type DH 70" or from the Nucleometre Company of Saint-Denis, France under the designation "Gamma Ray Gravitometer Type DG3x".

It should also be understood that of the valves shown in and described with reference to FIG. 1 at least the valves 1-14, 5a-8a and 21 are of the slide-valve type, wherein a plate is slidable in a housing which is interposed in a conduit, the plate having a hole which on sliding of the plate moves into and out of registry with the conduit cross-section, depending upon whether the valve is to permit or to block the flow of a fluid. These valves will later be discussed in more detail with reference to FIG. 2.

Inasmuch as more time is needed for filling each of the chambers A or B then for their emptying, the charges of slurry in the discharge conduit 29 will be interrupted by intervals of a clear hydraulic fluid. In view of the fact that it takes less time to fill the shorter chambers than to fill the longer chambers, the charges of slurry containing heavier particles will be interrupted by more clear water intervals then charges of slurry which contain coal particles. In this manner, clogging of the discharge conduit 29 by rock and/or coal particles is avoided. The particulate material which is to form the slurry is pumped from the receptacle 25 into which it is fed in a conventional manner which needs no explanation. Usually, however, the slurry will be supplied to the receptacle 25 by a conduit, and then the heavier particles will tend to settle at the region of the outlet of the supply conduit. Therefore, during each emptying of the receptacle, the operation of the arrangement will have to be switched once from using long chambers to using short chambers.

However, it is also possible to store the coal particles, on the one hand, and the rock particles, on the other hand, which are both to be conveyed from the underground excavation to the surface, in separate receptacles 25 in which case the switching of the chamber lengths will take place concurrently with the switching from one of the receptacles 25 to the other receptacle 25. While the present invention is being described in connection with a two-chamber arrangement it is equally conceivable to use a three-chamber arrangement in a similar manner.

Having thus discussd the construction of the basic arrangement of the present invention, as shown in FIG. 1, the operation of the arrangement—and the method according to the invention—will now be described in connection with a full cycle of operation of the chambers A and B. The arrangement operates the same way whether the shorter or the longer chambers are used, the only difference being the more frequent filling and emptying of the shorter chambers and thus the more frequent intervals of clear water between the charges of slurry in the discharge conduit 29.

The arrangement of the present invention operates on the principle of a lock or sluice in that the chambers A and B are alternatingly fed by the slurry pump 21 with slurry which fills the chambers A and B in one direction. Thus, for instance, the chamber A is filled with the low-pressure slurry in the direction from the valve 2 to the valve 8. When the chamber A is full, the valves 2 and 8 are closed and the valve 7a is opened whereby pressure equalization takes place between the conduit 28 and the chamber A. After that, the valve 7 is opened simultaneously with valve 1, so that the pressurized water delivered by the pump 19 discharges (ejects) the particulate material from the chamber A into the discharge conduit 29. Simultaneously with discharging of the contents of the chamber A into the conduit 29, the valves 3 and 5 of chamber B are opened so that the chamber B is filled with the low-pressure slurry by the pump 21. Inasmuch as the time needed for discharging each of the chambers into the discharge conduit 29 is somewhat shorter than the time needed for the filling of the respective other chamber with the low-pressure slurry, each slurry charge travelling in the discharge conduit 29 is followed by an interval of clear pressurized fluid, such as water. Thus, it will be understood that when the slurry contains particles of high specific weight, that is, when the shorter chambers are used with a corresponding reduction of both the filling and discharging time periods, the stream of slurry in the discharge conduit 29 will be interrupted much more frequently than when the longer chambers A and B are used.

Once the chamber B is full, the valves 7 and 1 of the chamber A are closed and the valve 8a is opened, whereby the pressure in the chamber A is relieved so that the valves 2 and 8 can be opened and the slurry pump 21 can again commence to fill the chamber A. Of course, the chamber B operates similarly in alternating relation with chamber A, the valves 3, 4, 5, 6, 5a and 6a being operated and functioning similarly to the valves 1, 2, 7, 8, 7a and 8a of the chamber A. The pressure-measuring devices (e.g. contact manometers) 23 and 24 measure or sense the conditions prevailing in the chambers A and B, and the valves 1 to 8a are operated in accordance with the signals derived from the devices 23 and 24. In all other respects, the arrangement of the present invention is entirely conventional and the operation self-evident from the drawing.

The operations of the arrangement in FIG. 1 are controlled by the control systems which will be discussed with reference to FIGS. 2–11.

Figure 2:
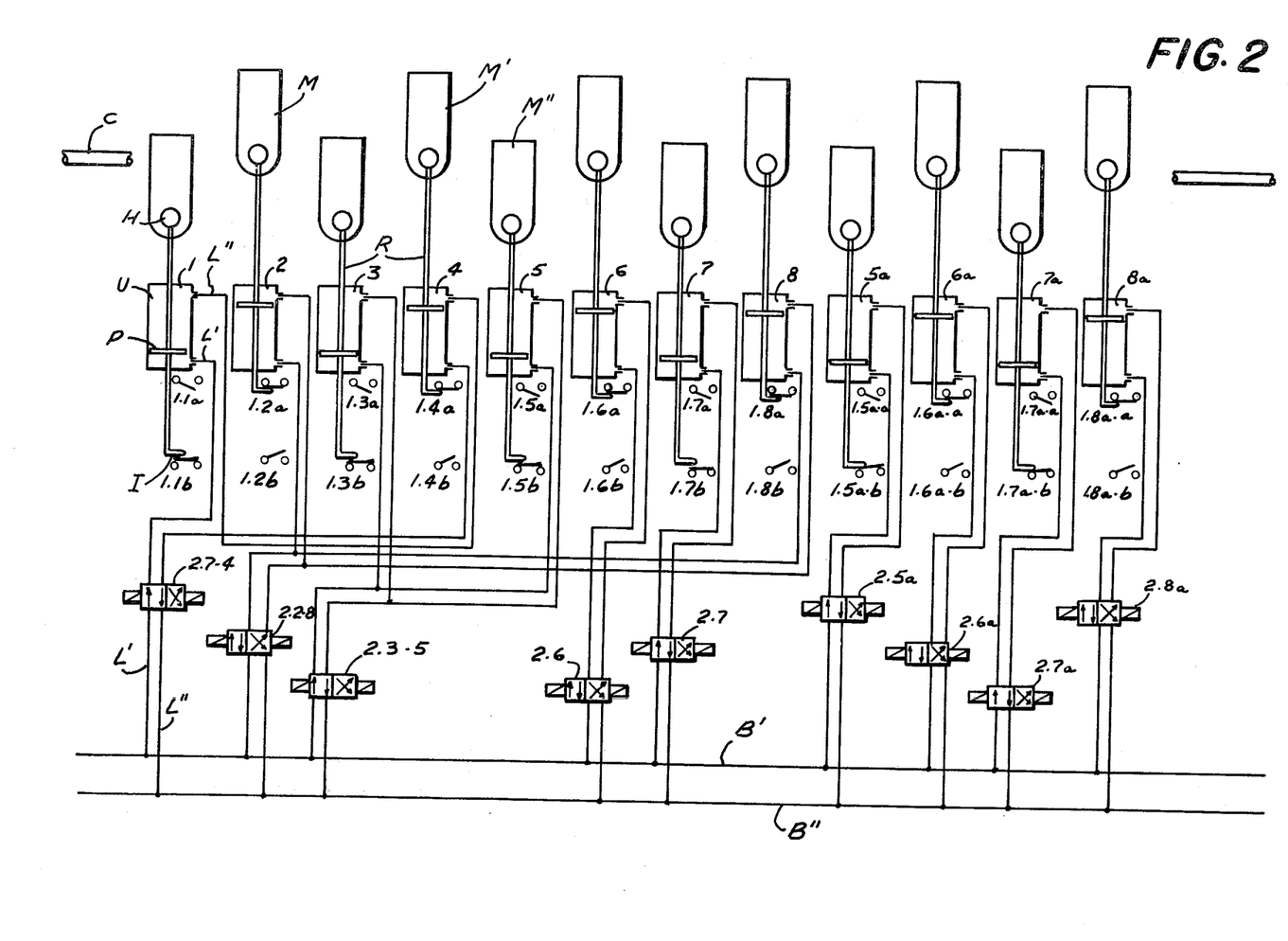
FIG. 2 is a diagrammatic illustration showing a part of the control circuit for the arrangement in FIG. 1.

FIG. 2 shows the part of the system which controls the operation of the valves 1-8 and 5a-8a. Each of these valves, as indeed all the valves shown in FIG. 1, has a housing which is installed (interposed) in the appropriate fluid conduit C so that fluid must flow through the housing. For the sake of clarity of the illustration the housings have been omitted, especially as such valves are well known per se. Slidable in each housing is a plate-shaped valve member M which can move between a first (e.g. upper) position M' and a second (e.g. lower) position M". For this purpose each member M is mounted on or otherwise provided with a piston rod R which is carried by the piston P of a double-acting cylinder-and-piston unit U. For ease of identification the units U are designated in FIG. 2 with the reference numerals of the valves 1-8 and 5a-8a, respectively. A portion of the respective rod R extends out of the unit U and carries a projection or similar instrumentality I which engages and operates a pair of limit switches associated with each of the units U. The pair of switches for the unit U of valve 1 includes one switch 1.1a which is closed by the projection I when the member M is in one position (the upper one in FIG. 2) and another switch 1.1b which is closed by projection I when the member M is in the other position (the lower one in FIG. 2). In the other units U, corresponding to the valves 2-8 and 5a-8a, the pairs of switches are numbered correspondingly, i.e., 1.2a and 1.2b, 1.3a and 1.3b and on through 1.8aa to 1.8ab.

Each member M has a hole H in it. When the respective member M is in the position M' this hole registers with the conduit C so that the valve is open and fluid can flow through it. Conversely, when a member M is in the position M", the hole H will not register with the conduit C; instead, a non-apertured portion of the member M is then located oposite the passage of the conduit and the valve is closed, i.e. blocks the flow of fluid.

The double-acting cylinder-and-piston units U of the valves 1-8 and 5a-8a are each connected with two fluid lines L' and L" for pressurized hydraulic fluid, which communicate with the cylinder of the respective unit U above and below the piston P, respectively. To avoid confusion only the fluid lines of the unit U for valve 1 are designated with reference characters in FIG. 2. The lines L' of all valves are connected with the inflow branch B' of a hydraulic fluid supply (which supplies fluid at e.g. 100 bar). The lines L" of the valves 2, 3, 5-8 and 5a-8a are all connected to the return branch 3" of this hydraulic supply. The line L" of valve 1, however, is connected with the line L" of valve 4 so that, when one of these two valves opens the other automatically closes, and vice versa. Lines L' and L" are led to the hydraulic supply in pairs so that an electrically controlled (e.g. solenoid-controlled) four-way two-position hydraulic control valve can be interposed in each of these pairs. These control valves are designated with reference numerals designating which of the valves 1-8 and 5a-8a they control. In other words: valve 2.1-4 controls the valves 1 and 4; valve 2.2-8 controls the valves 2 and 8, valve 2.3-5 controls the valves 3 and 5. Valves 2.6, 2.7, 2.5a, 2.6a, 2.7a and 2.8a each only control one valve, namely the valves 6, 7, 8, 5a, 6a, 7a and 8a, respectively. Each of the control valves can move between a right-hand open position (see e.g. valve 2.1-4) and a left-hand closed position (see e.g. valve 2.2-8).

A similar system to the one shown in FIG. 2 is used to control the operation of the valves 9-14; it is not illustrated to avoid repetition but will be readily understood from FIG. 2.

Figure 3:
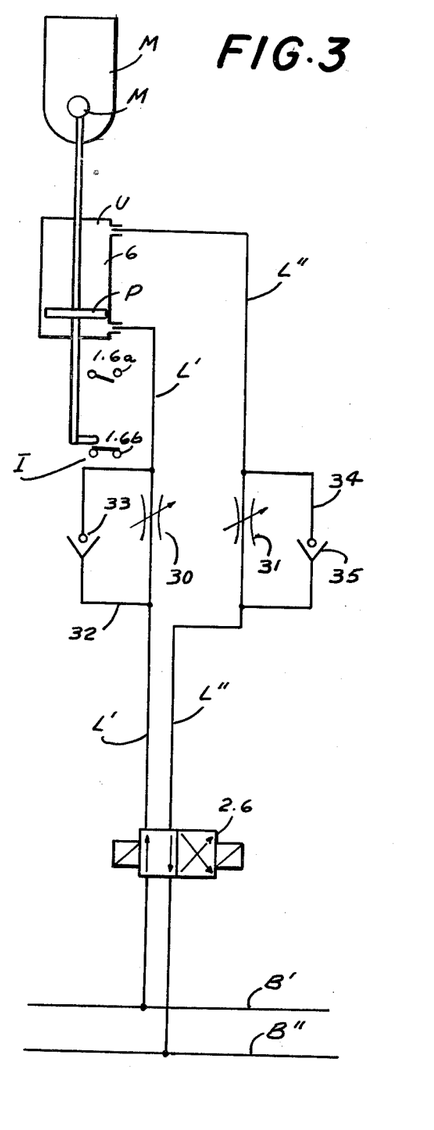
FIG. 3 is a diagrammatic showing of a detail of the control circuit in FIG. 2.

The valves 1-14 and 5a-8a (and, if desired, also the valves 15-18 and 22 which may be of the same type as these) are preferably individually adjustable to permit for each of these valves an individual selection of its operating time (i.e. the time required for cycling between open and closed positions). For this purpose each of these valves may be provided with an arrangement as shown in FIG. 3.

As shown there, intermediate the unit U and the control valve 2.6, the line L' has an adjustable throttle 30 interposed in it, and a similar throttle 31 is interposed in line L". A bypass 32 straddles the throttle 30 and has interposed in it a check valve valve 33 which permits fluid flow to the unit U but prevents backflow from the same. A second bypass 34 straddles the throttle 31 and has a check valve 35 interposed in it which also permits fluid flow to the unit U but prevents backflow from the same. The cycling time for valve 6 (and the others so equipped) can thus readily be individually changed by varying (i.e. increasing or decreasing) the effective flow-through cross-section of the throttles 30, 31.

Figure 4:
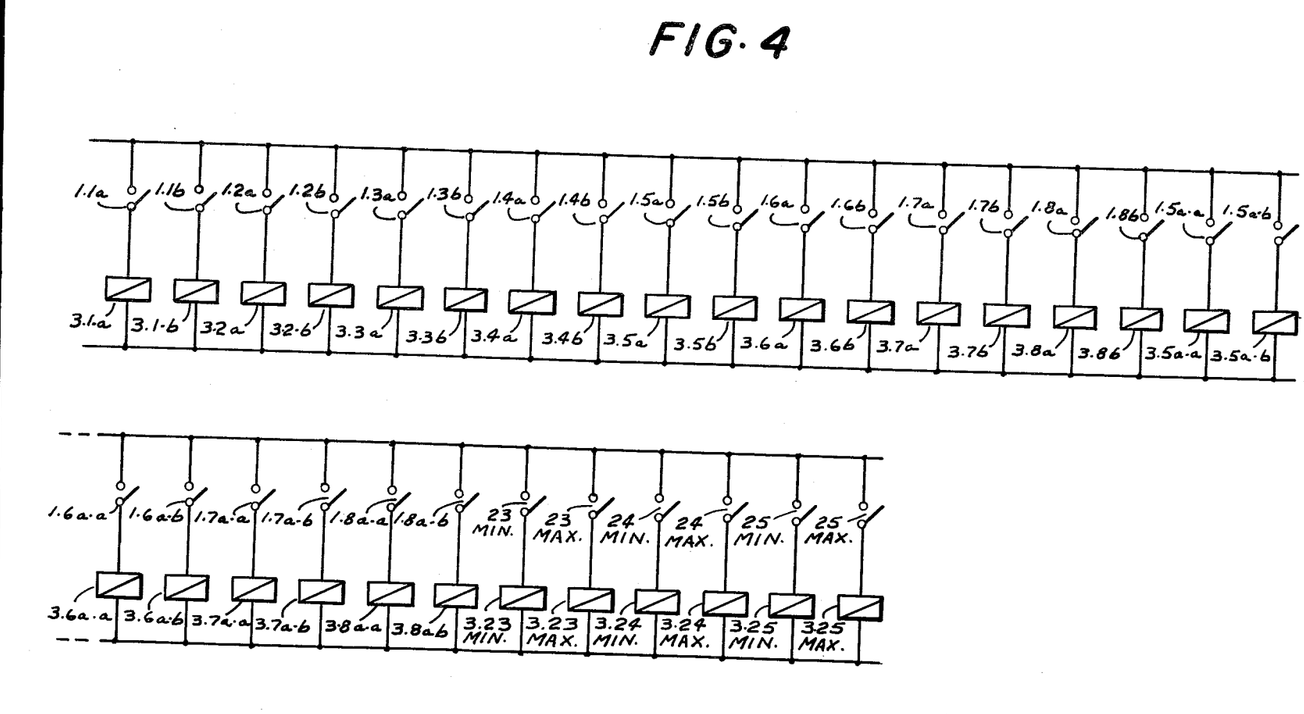
FIG. 4 is a circuit diagram showing the electrical supply for the control circuit in FIG. 2.
Figure 5:
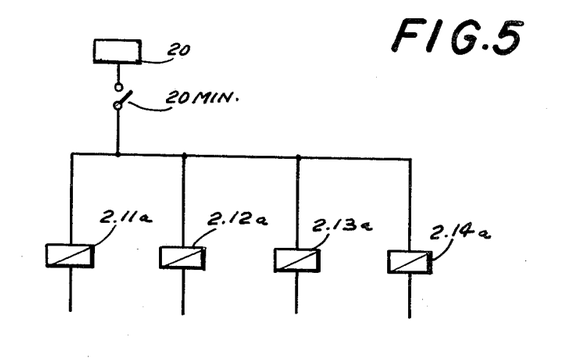
FIG. 5 is a fragmentary diagram showing another part of the control circuit which selects the long chambers.

FIG. 4 shows the current supply for the control relays which are associated with the valves 1-8, 5a-8a and the elements 23-25. It will be seen that in the current path of each of the limit switches of the valves 1-8 and 5a-8a there is interposed a control relay. These are designated in FIG. 4 with the prefix "3"; i.e. the relay for the limit switch 1.1a of valve 1 is designated as relay 3.1a; the relay for the limit switch 1.1b of valve 1 is designated as relay 3.1b; and so on through the relay 3.8b for the limit switch 1.8ab of valve 8a.

The contact manometers 23 and 24 each have associated with them two switches, one of which is closed when a preselected minimum pressure prevails in the chamber and the other of which is closed when a preselected maximum pressure prevails in the chamber. These switches are shown in FIG. 4 as switches 23 min, 23 max, 24 min and 24 max. In the current paths of these respective switches are interposed the control relays 3.23 min, 3.23 max, 3.24 min and 3.24 max.

Similarly, the receptacle 25 has a level monitoring device (known per se, e.g. a float) with which two switches 25 min and 25 max are associated which become closed when the contents of receptacle 25 reach a minimum and a maximum level, respectively (compare also FIG. 1). Interposed in the current paths controlled by these switches are the respective control relays 3.25 min and 3.25 max.

Figure 6:
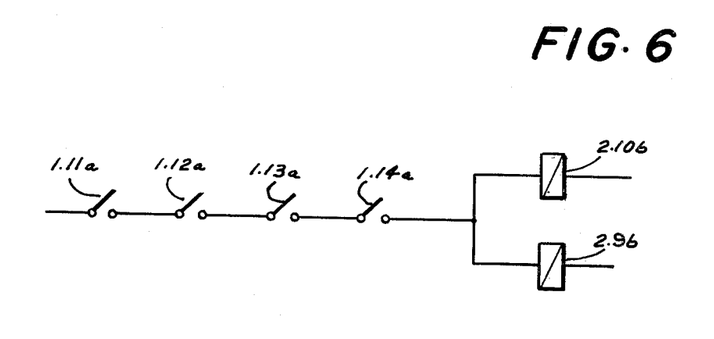
FIG. 6 is another fragmentary diagram showing a further part of the circuit in FIG. 5.
Figure 7:
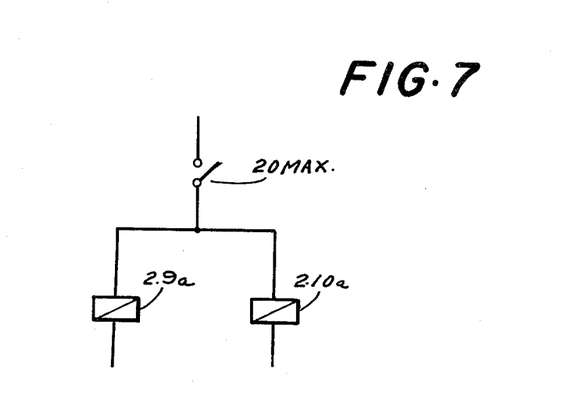
FIG. 7 is a fragmentary diagram showing a part of the control circuit which selects the short chamber.
Figure 8:
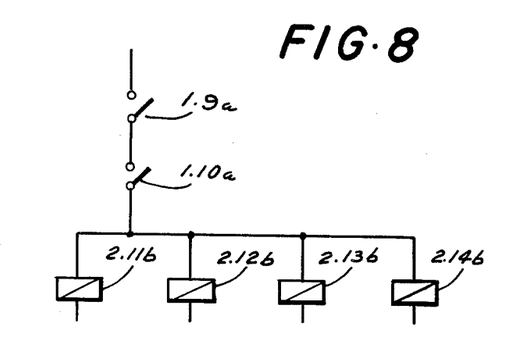
FIG. 8 is a fragmentary diagram showing another part of the circuit in FIG. 8.

As mentioned before, the long chambers A and B are selected for use when the device 20 signals that the specific weight of the slurry delivered by the pump 21 drops below a minimum value (e.g. 20 min.). For this purpose the device 20 also has two switches, 20 min. and 20 max (see also FIG. 7) which close when the specific weight drops below the minimum value (switch 20 min) and when the specific weight exceeds the maximum value (switch 20 max which will later be described with reference to FIG. 7). When the switch 20 min closes it energizes the control relays 2.11a, 2.12a, 2.13a and 2.14 which in turn each energize via the relays 3a (corresponding e.g. to relay 3.1a of FIG. 4) the solenoid of a four-way two-position control valve (corresponding e.g. to the control valve 2.6 of valve 6 in FIG. 2) to thereby permit the flow of hydraulic fluid to the valves 11-14 so that the latter move to open position. As the sliding valve members (corresponding to members M in FIG. 2) of the valves 11-14 reach their open positions, they open the associated limit switches 1.11a, 1.12a, 1.13a and 1.14a (corresponding e.g. to the limit switch 1.1a of FIG. 2) to interrupt the flow of current (FIG. 6). This causes the control relays 2.9b and 2.10b of the valves 9 and 10 to energize the solenoids of the four-way two-position control valves (not shown, but corresponding e.g. to valve 2.6 of FIG. 2) so as to admit hydraulic fluid to the valves 9, 10 in order to close the same. The chambers A and B have thus been selected for operation.

Conversely, the short chambers are selected when the specific weight of the slurry supplied by pump 21 exceeds the maximum value, as detected by the device 20. In this case (FIG. 7) it is the switch 20 max of the device 20 which closes, thereby energizing the relays 2.9a and 2.10a of the valves 9 and 10 and operating via their associated relays 36 (corresponding e.g. to relay 3.1b of FIG. 4) the four-way two-position control valves (corresponding e.g. to valve 2.6 of FIG. 2) of the valves 9, 10. This admits to the valves 9, 10 the hydraulic fluid required to move their members M (corresponding to members M of FIG. 2) to valve-closing position. During movement to the valve-closing position the limit switches 1.9a and 1.10a (corresponding e.g. to limit switch 1.1a of FIG. 2) are opened (FIG. 8) by the projection on the rods of valves 9 and 10, whereby the control relays 2.11b, 2.12b, 2.13b and 2.14b of the valves 11-14 energize via the relays 3b of these valves (corresponding e.g. to relay 3.1b of FIG. 4) the solenoids of the four-way two-position control valves for the valves 11-14, so that the valves 11-14 move to closed position.

Figure 9:
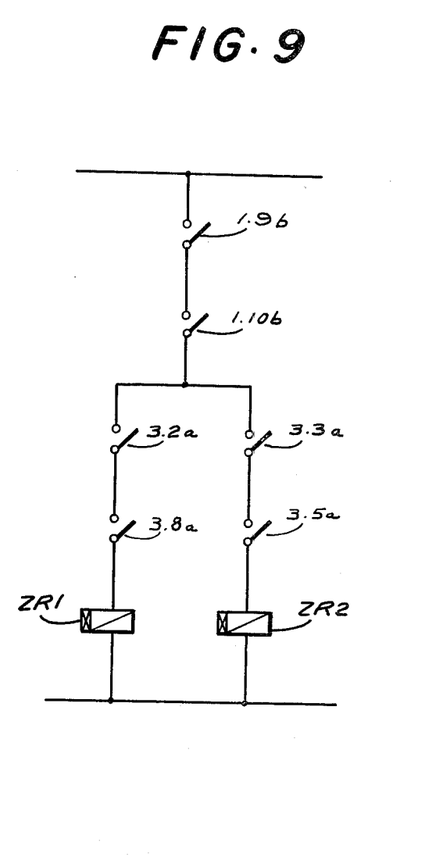
FIG. 9 is a further fragmentary diagram of a part of the control circuit which selects the time delay.
Figure 10:
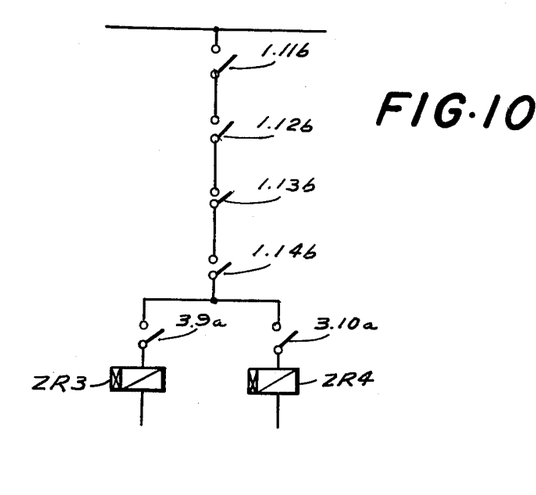
FIG. 10 is a fragmentary diagram illustrating another time-delay part of the control circuit.

It may be desired or necessary to have some time delay between the selection of different-length chambers, i.e. when switching from the use of the long chambers A and B to the use of the short chambers and vice versa. As shown in FIGS. 9 and 10 the control circuits for the valves 9 and 10 may include time delays relays ZR1 and ZR2 (FIG. 9) which are connected in circuit with the limit switches 1.9b and 1.10b of the valves 9, 10 and with the control relays 3.2a, 3.3a, 3.5a and 3.8a of the valves 2, 3, 5 and 8, respectively. Such time delay relays are well known per se and may either be of the type offering a fixed time delay or of the type offering an adjustable time delay. Thus, when the valves 9, 10 are in the closed position the time delay relays ZR1 and ZR2 delay energization of the valves 11-14 (if the larger chambers are selected by the device 20 for the next filling operation) by a time which may amount from some seconds to some minutes, depending upon the type of time delay relay.

Conversely, the control circuits for the valves 11-14 may have the same type of arrangement associated with them; i.e. time delay relays ZR3 and ZR4 (FIG. 10) are connected in circuit with the limit switches 1.11b, 1.12b, 1.13b and 1.14b of the valves 11-14 and with the control relays 3.9a and 3.10a of the valves 9, 10.

In some operating conditions there is a rather frequent change of the specific slurry weight between the maximum and minimum values. This could result in overfilling of the respective chambers; i.e. a set of long or short chambers could be selected for filling (and new slurry be fed into these selected chambers) before they have been completely emptied of the previously admitted slurry charge. To avoid this it is advantageous (although not necessary in every case) to provide a delay arrangement which will temporarily de-energize (for a matter of seconds to at most some minutes) the pump 21 and the conveyor 26, until it is certain that the chambers selected to be filled next have been emptied of the slurry charge which was previously admitted into them.

Figure 11:
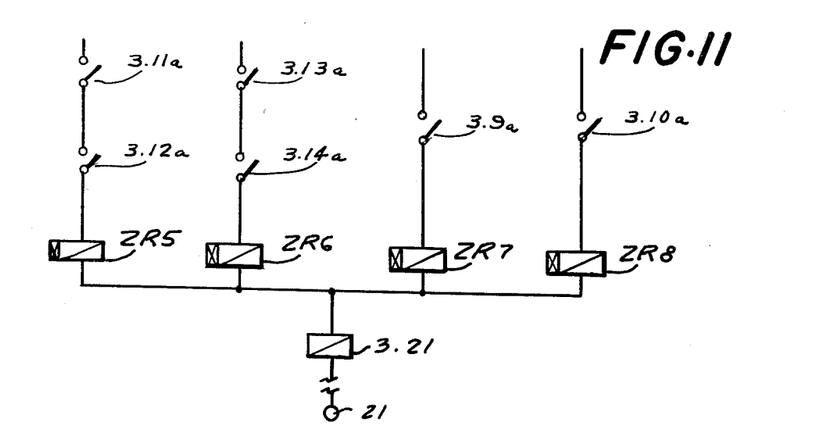
FIG. 11 is another diagrammatic illustration, showing a further part of the time-delay circuit.

Such an arrangement is shown in FIG. 11 where it will be seen that a time delay relay ZR5 is connected in the circuit of the control relays 3.11a and 3.12a of the valves 11 and 12. A similar time delay relay ZR6 is connected in the circuit of the control relays 3.13a and 3.14a for the valves 13 and 14. The circuit of control relay 3.9a for valve 9 has a time delay relay ZR7 interposed in it and the circuit of control relay 3.10a for the valve 10 has a similar time delay relay ZR8 interposed in it. The relays ZR5 - ZR8, when energized, respond (operate) with a time delay which is approximately twice as long as the time required for the respectively associated chambers (i.e. the long chambers A and B for relays ZR5 and ZR6; the short chambers for relays ZR7 and ZR8) to become completely emptied of their previous slurry charge. The relays ZR5 - ZR8 control the pump 21 via the control relay 3.21 thereof (they similarly control the conveyor 26 via the control relay of the same, although it is not considered necessary to show this connection separately) and maintain them de-energized until elapse of the predetermined time delay. Thus, the control circuit is able —depending upon the signals of the device 20—to select the next group of long or short chambers for filling, but the actual implementation of the filling operation is delayed until the relays ZR5 and ZR6 (or ZR7 and ZR8) energize the pump 21 and conveyor 26 which then fill the previously selected chambers.

It may be desirable to be able to regulate the filling speed and/or the emptying speed of long and short chambers. If so, the filling speed can be varied by reducing the flow-through cross-section of the valve 17 through which the hydraulic fluid (water) in the respective chambers is being expelled as the chambers are being filled with slurry from the receptacle 25. The speed of expulsion, i.e. the time required for emptying the respective chambers of their slurry charge via the conduit 29, can similarly be varied by changing the flow-through cross-section of the valve 18 through which hydraulic fluid from reservoir 27 is admitted into the chambers. The valves 17 and 18 are advantageously rotary-ball valves which can be manually operated.

It will be understood that each of the elements described above, or two or more together, may also find a useful application in other types of arrangements differing from the types described above.

While the invention has been illustrated and described as embodied in an arrangement for hydraulically conveying solids of different specific weights in the form of slurries, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An arrangement for hydraulically conveying solids of different specific weights in form of slurries comprising, in combination, at least two elongated chambers lack having a different volume; a source of slurry; a source of pressurized hydraulic fluid; conduit means including slurry supply conduits communicating said source of slurry with said chambers for admission of slurry into the latter, a discharge conduit communicating with said chambers, and fluid conduits communicating said source of hydraulic fluid with said chambers for expulsion of admitted slurry from the chambers; valve means operative for selectively cyclically establishing and interrupting communication of said conduits with said chambers; means for detecting the specific weight of the solid component in the slurry supplied by said slurry source; and means for selecting one of the chambers as a function of the detected specific weight of the solid component of the slurry.

2. A combination as defined in claim 1, wherein said selecting means includes valves operative for including a part of each chamber into the path of flow of said slurry and said hydraulic fluid through such chamber, and for excluding such part from said path.

3. A combination as defined in claim 1, and said detecting means comprising a specific weight measuring device in said supply conduit communicating said source of slurry with said chambers; and wherein said selecting means is operative in dependence on the indication of said specific weight measuring device.

4. A combination as defined in claim 1; wherein said selecting means is operative for utilizing said larger volume when the specific weight of the solid component of the slurry approximates that of coal.

5. A combination as defined in claim 1, wherein said selecting means is operative for utilizing said smaller volume when the specific weight of the solid component of the slurry approximates that of rock.

6. A combination as defined in claim 1; and further comprising means for varying the rate of admission of the slurry into the respective chambers per unit time.

7. A combination as defined in claim 1; and further comprising means for varying the rate of expulsion of the slurry from the respective chambers per unit time.

8. A method of hydraulically conveying solids of different specific weights in form of slurries, with an arrangement having at least two chambers each having a different effective volume, comprising the steps of sensing the specific weight of a slurry to be conveyed to determine whether it is below or above a predetermined limit; selecting the chamber with the maximum chamber length when the specific slurry weight is below said predetermined limit, and selecting the chamber with the minimum chamber volume when the specific slurry weight is above said predetermined limit; admitting the slurry into one of the chambers having the selected chamber volume hydraulically expelling the slurry from said one chamber so as to convey the expelled slurry to a remote location and simultaneously with the step of expelling also admitting slurry into the other of said chambers having the selected chamber volume; and repeating the preceding steps.

* * * * *